United States Patent
Deng et al.

(10) Patent No.: US 8,244,259 B2
(45) Date of Patent: Aug. 14, 2012

(54) METHOD AND DEVICE FOR RELAY STATION TO FORWARD DOWNLINK SIGNAL

(75) Inventors: Shiqiang Deng, Shenzhen (CN); Aimin Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 943 days.

(21) Appl. No.: 12/172,042

(22) Filed: Jul. 11, 2008

(65) Prior Publication Data
US 2008/0285502 A1 Nov. 20, 2008

Related U.S. Application Data

(63) Continuation of application No. PCT/CN2007/000124, filed on Jan. 12, 2007.

(30) Foreign Application Priority Data

Jan. 12, 2006 (CN) .......................... 2006 1 0001501

(51) Int. Cl.
*H04B 7/15* (2006.01)
(52) U.S. Cl. ....................................... 455/447; 455/448
(58) Field of Classification Search .................. 455/446, 455/447, 448
See application file for complete search history.

(56) References Cited

U.S. PATENT DOCUMENTS

| | | | | |
|---|---|---|---|---|
| 8,099,042 B2* | 1/2012 | Wang et al. | .................. | 455/13.1 |
| 2004/0205105 A1* | 10/2004 | Larsson et al. | ................. | 709/200 |
| 2004/0266339 A1* | 12/2004 | Larsson | ........................... | 455/7 |
| 2005/0014464 A1* | 1/2005 | Larsson | ...................... | 455/11.1 |
| 2007/0160014 A1 | 7/2007 | Larsson | | |
| 2007/0178831 A1 | 8/2007 | Takeda et al. | | |
| 2009/0286465 A1* | 11/2009 | Lin et al. | ...................... | 455/3.01 |
| 2010/0157826 A1* | 6/2010 | Yu et al. | ........................ | 370/252 |
| 2010/0182916 A1* | 7/2010 | Drewes et al. | ................ | 370/252 |

FOREIGN PATENT DOCUMENTS

| | | | |
|---|---|---|---|
| CN | 1507167 A | 6/2004 | |
| CN | 1547862 A | 11/2004 | |

(Continued)

OTHER PUBLICATIONS

Written Opinion of the International Searching Authority in corresponding PCT Application No. PCT/CN2007/000124 (Apr. 19, 2007).

(Continued)

*Primary Examiner* — Melvin Marcelo
(74) *Attorney, Agent, or Firm* — Leydig, Voit & Mayer, Ltd.

(57) ABSTRACT

A method for relay stations (RSs) to forward downlink signals includes: obtaining downlink qualities between a mobile station (MS) and each of the RSs; determining an RS group for forwarding downlink signals according to difference degrees among all of the downlink qualities; performing space-time coding on the downlink signals through the RSs in the RS group when the RS group contains a plurality of RSs. Another method for RSs to forward downlink signals includes: setting the number of the RSs for forwarding the downlink signals to plurality; obtaining downlink qualities between an MS and each of the RSs; determining an RS group for forwarding the downlink signals according to each of the downlink qualities and the number of the RSs; performing space-time coding on the downlink signals through the RSs in the RS group, and forwarding the downlink signals to the MS. A device structure for the RSs to forward the downlink signals is also provided.

23 Claims, 8 Drawing Sheets

FOREIGN PATENT DOCUMENTS

| | | |
|---|---|---|
| CN | 101001098 B | 7/2010 |
| WO | WO 2005/064872 A1 | 7/2005 |
| WO | WO 2005/120100 A1 | 12/2005 |

OTHER PUBLICATIONS

International Search Report in corresponding PCT Application No. PCT/CN2007/000124 (Apr. 19, 2007).

1st Office Action in corresponding Chinese Application No. 200610001501.7 (Jun. 5, 2009).

Alamouti, "A Simple Transmit Diversity Technique for Wireless Communications," IEEE Journal on Select Areas in Communications, Oct. 1998, vol. 16, No. 8, Institute of Electrical and Electronic Engineers, Redmond, Washington.

Deng et al., "IEEE C802.16mmr-05/026—Recommendation on Mobility Management of Mobile Multi-hop Relay," IEEE 802.16 Presentation Submission Template (Rev. 8.3), Nov. 11, 2005, Institute of Electrical and Electronic Engineers, Vancouver, BC, Canada.

* cited by examiner

METHOD AND DEVICE FOR RELAY STATION TO FORWARD DOWNLINK SIGNAL

CROSS-REFERENCE TO RELATED APPLICATIONS

This application is a continuation of International Patent Application No. PCT/CN2007/000124, filed Jan. 12, 2007, which claims priority to Chinese Patent Application No. 200610001501.7, filed Jan. 12, 2006, entitled "Method and Device for Relay Station to Forward Downlink Signal," both of which are hereby incorporated by reference in their entirety.

FIELD OF THE INVENTION

The present invention relates to wireless communication and more particularly to a method and device for relay stations to forward downlink signals.

BACKGROUND

In a wireless communication system, due to the path attenuation of electromagnetic waves, or blockage by buildings, the strength of wireless communication signals may become lower in some areas, and the communication quality of mobile terminals in these areas will be degraded. To solve this problem, relay stations (RSs) are used to enhance the wireless communication signals between base stations (BSs) and mobile stations (MSs). Structures of wireless communication systems having RSs are categorized into two types: the coverage enhanced situation and the rate enhanced situation.

FIG. 1 is a schematic view showing RSs expanding the coverage of a BS. Referring to FIG. 1, MS 1 is directly covered by the BS; however, MS 2 and MS 3 are not directly covered by the BS, but are forwarded by RS 1 and RS 2 to be covered by the BS. The previous situation in which the RSs are used to improve the coverage is referred to as a coverage enhanced situation.

FIG. 2 is a schematic view showing RSs improving the communication rate in the coverage of a BS. As shown in FIG. 2, MS 1, MS 2, and MS 3 are all directly covered by the BS, but MS 2 and MS 3 are distant from the BS. Because of the path attenuation, when the more distant an MS is away from the BS, the lower the strength of the signals that the MS receives from the BS will be. Therefore, the maximum communication rate of an MS is lower if it is more distant from the BS, and the quality of service (QoS) of the MSs distant from the BS is not guaranteed. Therefore, through a higher level code modulation mode, RS 1 and RS 2 enable MS 2 and MS 3 to obtain a rate higher than the rate of direct communication with the BS. The previous situation in which the RSs are used to realize more even communication rate distribution is referred to as the rate enhanced situation.

Irrespective of which wireless communication system structure having RSs is used, to prevent interferences, each of the RSs belonging to a administer area of the same BS always use the time-frequency resources orthogonally when forwarding downlink services of the MSs. In other words, a same time-frequency resource can be used by only one RS. The BS uniformly designates the time-frequency resources used by the RSs. For example, in a downlink service frame of an RS, the time-frequency resource of a burst 3 of RS 1 cannot be used by RS 2, and the time-frequency resource of a burst 4 of RS 2 cannot be used by RS 1 as well. Therefore, in current communication solutions using the RSs, an MS directly communicates with only one RS that has the best communication quality or directly communicates with the BS generally unless the MS is in the handover state.

However, when an MS is covered by a plurality of RSs at the same time (for example, MS 2 in FIG. 1 or FIG. 2), if the distance between the RSs is great, the MS is often at the edge of the coverage of each RS. At this time, normally the BS selects an RS with relatively signal strength to forward the downlink data for the MS. Irrespective which RS is selected to forward the downlink data, due to the relatively large path attenuation, the receiving signal-to-noise ratio of the MS will be low, and the RS will also provide a low communication rate, which cannot satisfy the Quality of Service (QoS) requirements of the MS.

SUMMARY

To solve the problem that resources of a plurality of relay stations (RSs) are not utilized sufficiently when a mobile station (MS) is covered by the plurality of RSs, the present invention is directed to provide a method and a device for RSs to forward downlink signals.

To solve the previous technical problem, embodiments of the present invention include the following technical solutions.

A method for RSs to forward downlink signals includes:
downlink qualities between a mobile station (MS) and each of the RSs are obtained;
an RS group for forwarding downlink signals is determined according to difference degrees among all of the downlink qualities; and
each of the RSs in the RS group forwards the downlink signals to the MS.

When the RS group includes at least two RSs, each of the RSs in the RS group forwarding the downlink signals to the MS includes:
a base station (BS) sends the downlink signals containing service data and space-time coding instructions to each of the RSs in the RS group;
each of the RSs performs space-time coding of a corresponding branches on the downlink signals from the BS according to the received space-time coding instructions;
each of the RSs forwards the space-time coded downlink signals to the MS at the same time.

A method for RSs to forward downlink signals, in which the number of the RSs for forwarding the downlink signals is set to plurality, further includes:
downlink qualities between an MS and each of the RSs are obtained;
an RS group for forwarding the downlink signals is determined according to each of the downlink qualities and the number of the RSs;
each of the RSs in the RS group forwards the downlink signals to the MS.

The process of forwarding the downlink signals by each of the RSs in the RS group to the MS includes:
a BS sends the downlink signals containing service data and space-time coding instructions to each of the RSs in the RS group;
each of the RSs performs space-time coding of a corresponding branches on the downlink signals from the BS according to the received space-time coding instructions.

The RSs forward the space-time coded downlink signals to the MS at the same time.

A BS includes a decision making unit and a space-time coding instructions sending unit.

The decision making unit is adapted to determine an RS group for forwarding downlink signals according to difference degrees of downlink qualities between an MS and each of the RSs.

The space-time coding instructions sending unit is adapted to send space-time coding instructions different with each other to the plurality of RSs in the RS group.

The BS further includes: a calculating unit.

The calculating unit is adapted to estimate the downlink qualities between the MS and each of the RSs according to each of uplink qualities and preset resource configurations.

The present invention provides a BS, which includes a number setting unit, a decision making unit and a space-time coding instructions sending unit.

The number setting unit is adapted to set number of RSs for forwarding downlink signals.

The decision making unit is adapted to determine an RS group for forwarding the downlink signals according to differences of downlink qualities between an MS and each of the RSs and the number of the RSs.

The space-time coding instructions sending unit is adapted to send space-time coding instructions different with each other to the plurality of RSs in the RS group.

The BS further includes: a calculating unit.

The calculating unit is adapted to estimate the downlink qualities between the MS and each of the RSs according to each of uplink qualities and preset resource configurations.

An RS includes a BS instruction extracting unit, which further includes a space-time coding unit.

The space-time coding unit is adapted to perform space-time coding of a corresponding branch of downlink signals from a BS according to space-time coding instructions in the BS instruction extracting unit.

An MS includes a downlink measuring unit, a decision making unit, and a diversity combining unit.

The downlink measuring unit is adapted to measure downlink qualities between an MS and each of the RSs.

The decision making unit is adapted to determine an RS group for forwarding downlink signals according to the downlink qualities.

The diversity combining unit is adapted to perform diversity combination of the differently space-time coded downlink signals from the RSs in the RS group and received at the same time.

It is known from the technical solutions that in the present invention, as the downlink qualities between the MS and the RSs are obtained, when the MS is covered by a plurality of RSs at the same time and the difference degrees between the downlink qualities are small, a plurality of RSs is selected for forwarding the downlink signals. Because of the different distances and the different transmission paths between the MS and the RSs, the downlink signals from different RSs and received by the MS at the same time satisfy the requirements on diversity combination, and thus, the MS can obtain the diversity gain. Therefore, the communication quality is improved, which better meets the QoS requirements of the MS.

In the present invention, the number of the RSs for forwarding downlink signals is set to two or more. When the MS is covered by a plurality of RSs at the same time, a plurality of RSs is determined to forward the downlink signals according to the downlink qualities between the MS and the RSs and the number of the RSs. Because of the different distances and the transmission paths between the MS and the RSs, the downlink signals from different RSs and received by the MS at the same time satisfy the requirements on diversity combination, and thus, the MS can obtain the diversity gain. Therefore, the communication quality is improved, which better meets the QoS requirements of the MS.

DETAILED DESCRIPTION

The core idea of the present invention includes when an MS is covered by a plurality of RSs, an RS group for forwarding downlink signals is determined, and each of the RSs in the RS group forward the downlink signals to the MS.

Figure 1:
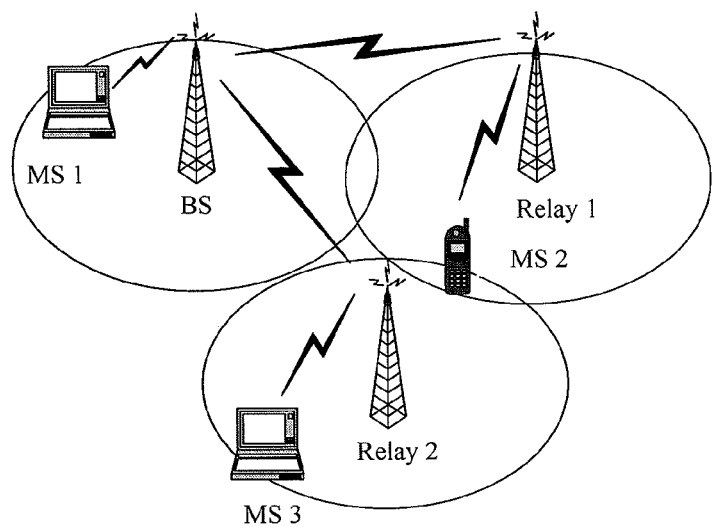
FIG. 1 is a schematic view showing RSs expanding the coverage of a BS.
Figure 2:
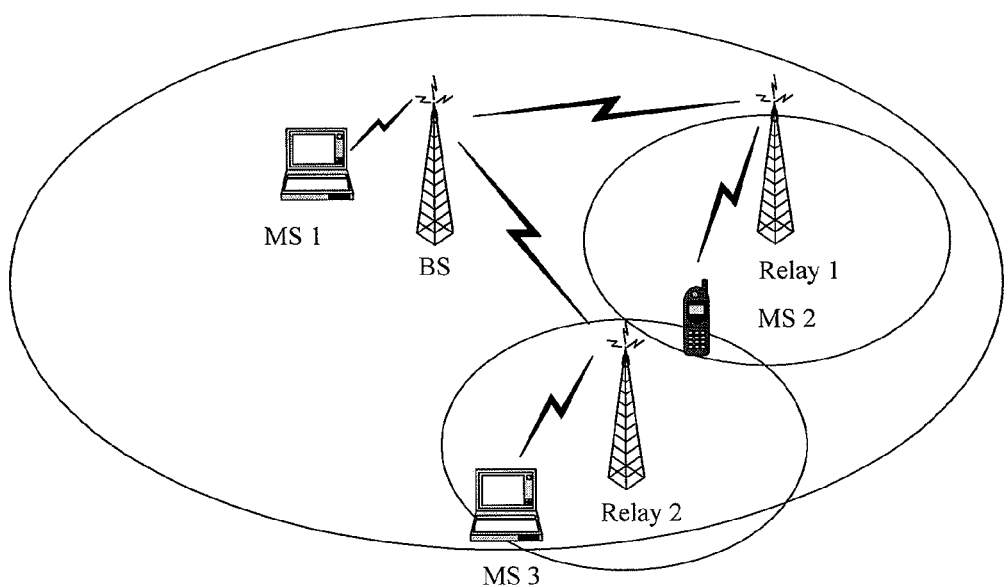
FIG. 2 is a schematic view showing RSs improving the communication rate in the coverage of a BS.
Figure 3:
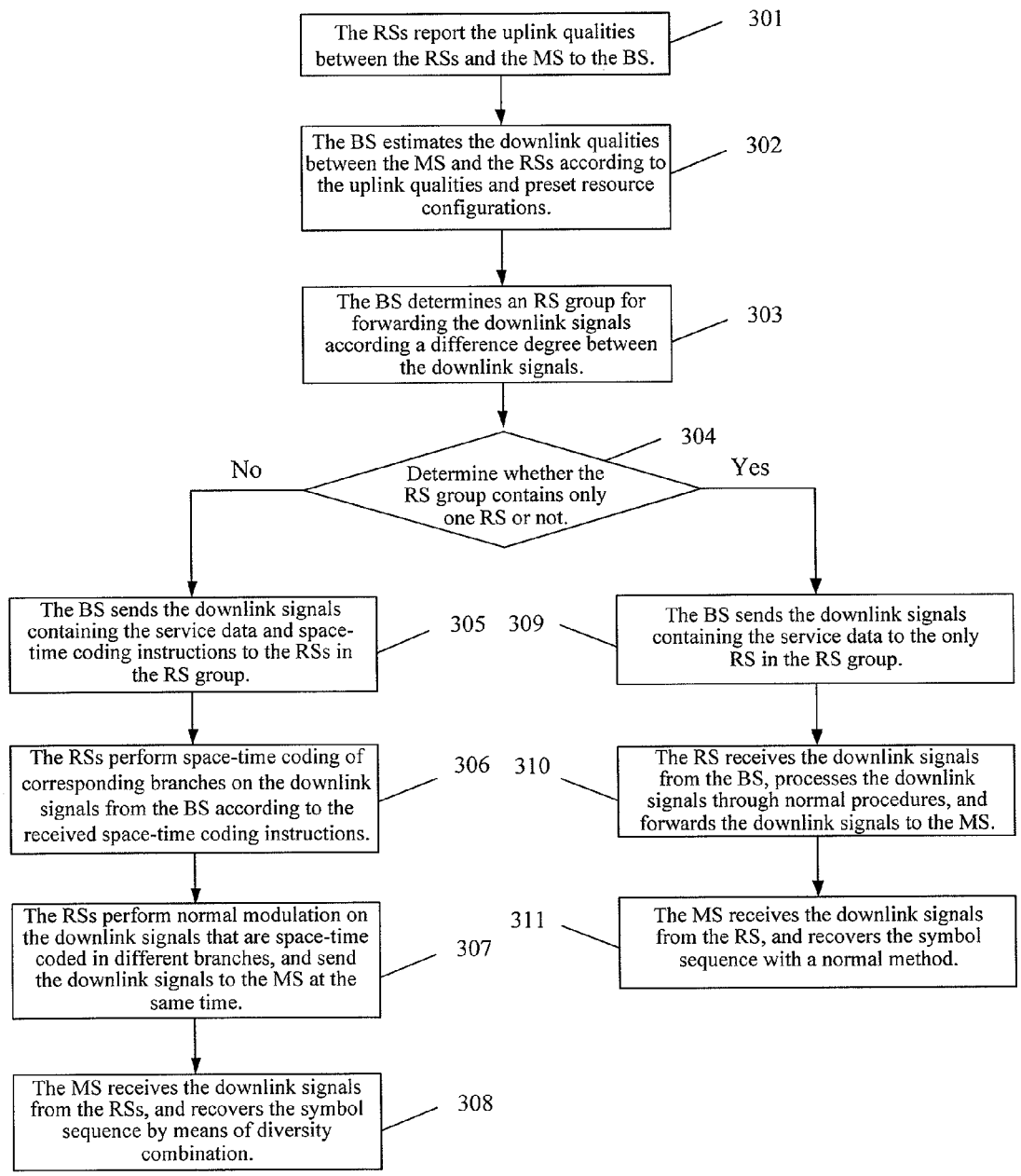
FIG. 3 is a flow chart of the method for RSs to forward downlink signals according to the first embodiment of the present invention.

FIG. 3 is a flow chart of the method for RSs to forward downlink signals according to the first embodiment of the present invention.

Step 301: The RSs report uplink qualities between the RSs and an MS to a BS.

The RSs measure the uplink qualities between the RSs and the MS. The uplink qualities between the MS and the RSs can be expressed in various formats, among them; the most common formats are the average power or the signal-to-noise ratio of the signals received by the RSs from the MS. In other words, the RSs measure the average power or the signal-to-noise ratio of the signals received from the MS, and then report the measurement results to the BS Preferably, to reduce the unnecessary signaling overhead, a report threshold of the uplink quality is set for each of the RSs according to the lowest power or smallest signal-to-noise ratio of the MS signals that the RSs can demodulate normally. If an RS measures the uplink quality between an RS and the MS and determines that the measurement result is greater than its report threshold, the RS reports the measurement result to the BS; otherwise, the RS does not report the measurement result. This is because if the RS cannot demodulate the MS signals correctly, it is almost meaningless to forward signals to the MS through the RS.

Step 302: The BS estimates the downlink qualities between the MS and the RSs according to the uplink qualities and preset resource configurations.

If the uplink quality reported by an RS is the average power of the signals received by the RS from the MS, the BS can use the following formula to estimate the downlink quality between the MS and the RS, that is, to estimate the average power of the signals transmitted by the RS when the signals are received by the MS:

$$\begin{aligned}&\text{Average power of the signals transmitted by an RS}\\&\text{when the signals are received by the MS=RS}\\&\text{transmit power−(MS transmit power−Average}\\&\text{power of the signals received by the RS from the}\\&\text{MS)}.\end{aligned} \quad (1)$$

The MS transmit power is set by the BS according to the power control requirements, and the RS transmit power is also a preset resource. Therefore, the BS can obtain the previous information. The difference between the MS transmit power and the average power of the signals received by the RS from the MS is the uplink attenuation between the MS and the RS. Generally, in a short period, the uplink and downlink attenuations between the MS and the RS are approximately the same. Therefore, the value of the uplink attenuation can be used as the value of the downlink attenuation directly or after some modification. Accordingly, the average power of the signals transmitted by the RS when the signals are received by the MS can be estimated by deducting the downlink attenuation between the RS and the MS from the RS transmit power.

Normally, the difference between the noise strength of the RS and that of the MS is a constant value, that is:

$$\text{Noise strength of the RS=Noise strength of the MS-Constant value} \quad (2)$$

Therefore, if the uplink qualities reported by the RSs are the signal-to-noise ratios of the signals received by the RSs from the MS, the downlink qualities between the MS and the RSs can be estimated by using the following formulas, that is, to estimate the signal-to-noise ratios of the signals transmitted by the RSs when the signals are received by the MS. Formula (3) is obtained by deducting formula (2) from formula (1):

$$\begin{aligned}&\text{Signal-to-noise ratio of the signals transmitted by an}\\&\text{RS when the signals are received by the MS=RS}\\&\text{transmit power−MS transmit power+Signal-to-}\\&\text{noise ratio of the signals received by the RS from}\\&\text{the MS+Constant value}\end{aligned} \quad (3)$$

Step 303: The BS determines the RS group for forwarding the downlink signals according to the difference degrees between the downlink qualities.

When the downlink qualities between the MS and two or more RSs do not vary much, there are two situations: one is that the MS is at an approximately same distance to a plurality of RSs. The other is that though the MS is closer to an RS, they are blocked by large buildings or mountains, so the downlink quality between the RS and the MS is degraded.

When the downlink qualities between the MS and the RSs vary much, normally, the quality of one of the downlinks is very good, while the qualities of other downlinks are much lower than the quality of this downlink. Generally, this situation indicates that the MS is closer to one of the RSs, or in other words, is in the central area of the coverage of one of the RSs, so the MS can obtain strong downlink signals from the RS.

In the sequence from the best quality to the worst downlink quality, the RS corresponding to the best downlink quality is put into the RS group for forwarding the downlink signals. Then, the differences (absolute values) between the qualities of other downlinks and the best downlink quality are compared with a preset threshold, which is determined according to the target quality of communication. In detail, the best downlink quality is compared with the second best downlink quality first, and the difference between them is then compared with the preset threshold:

If the difference is greater than the preset threshold, it indicates that the second best downlink quality varies much from the best downlink quality; in other words, the MS is close to the RS corresponding to the best downlink quality. At this time, the RS is used to forward the downlink signals. Compared with the communication rate when the downlink signals are forwarded by a plurality of RSs, the difference of communication rate obtained by the MS does not vary much. Therefore, it is unnecessary to put the RSs corresponding to other downlink qualities to the RS group.

If the difference is smaller than the preset threshold, it is indicated that the difference between the second best downlink quality and the best downlink quality does not vary much. Therefore, the RS corresponding to the best downlink quality and the RSs corresponding to other downlink qualities are put into the RS group for forwarding downlink signals.

Because the other downlink qualities are multiple normally, if each of the RSs corresponding to other downlink qualities are put into the RS group for forwarding the downlink signals, the RSs will have to bear too much load. Preferably, only the RS corresponding to the second best downlink quality is put into the RS group for forwarding downlink signals. When two RSs are used together to forward the downlink signals, the MS can obtain the communication rate that satisfies the QoS requirements. Certainly, three or more RS can be put into the RS group for forwarding the downlink signals.

Step 304: Determine whether the RS group contains only one RS. If the RS group contains only one RS, proceed to Step 309, otherwise, proceed to Step 305.

Step 305: The BS sends the downlink signals containing service data and space-time coding instructions to each of the RSs in the RS group.

The space-time coding instructions are control information that the BS sends to the RSs for instructing the RSs to select which branch to perform the space-time coding of the downlink signals. The space-time coding has multiple branch structures, and the RSs for forwarding the same downlink signal must use different branches to perform the time-space coding. In this embodiment, it is assumed that the Orthogonal Frequency Division Multiple Access (OFDMA) mode is used, and the RS group contains two RSs.

Figure 4:
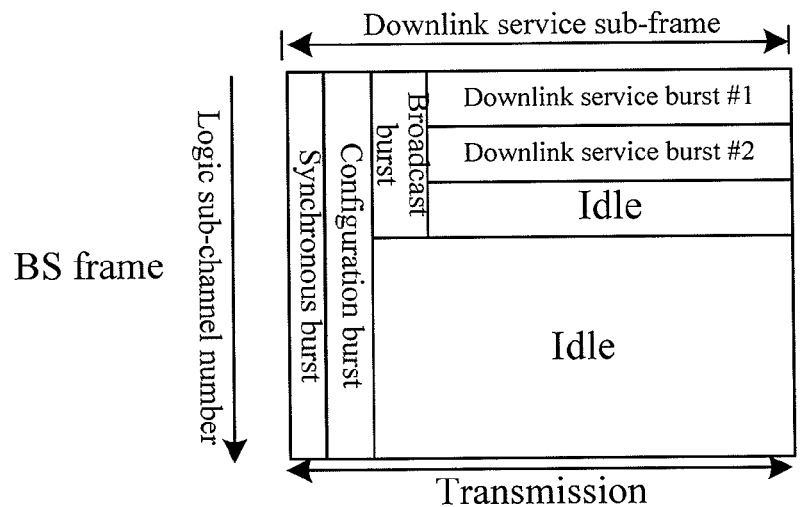
FIG. 4 is a schematic view of a wireless sub-frame structure of a BS.

FIG. 4 is a schematic view of a wireless sub-frame structure of a BS. The service data are transmitted in the service bursts, and the space-time coding instructions are transmitted in the configuration bursts. The BS sends the same service data and different space-time coding instructions to RS 1 and RS 2. The space-time coding instruction sent to RS 1 instructs RS 1 to use the first branch structure to perform the space-time coding on the downlink signals to be forwarded. The space-time coding instruction sent to RS 2 instructs RS 2 to use the second branch structure to perform the space-time coding on the downlink signals to be forwarded.

Step 306: The RSs perform the space-time coding of corresponding branches on the downlink signals from the BS according to the received space-time coding instructions. For example, the RS group still contains two RSs.

Figure 5:
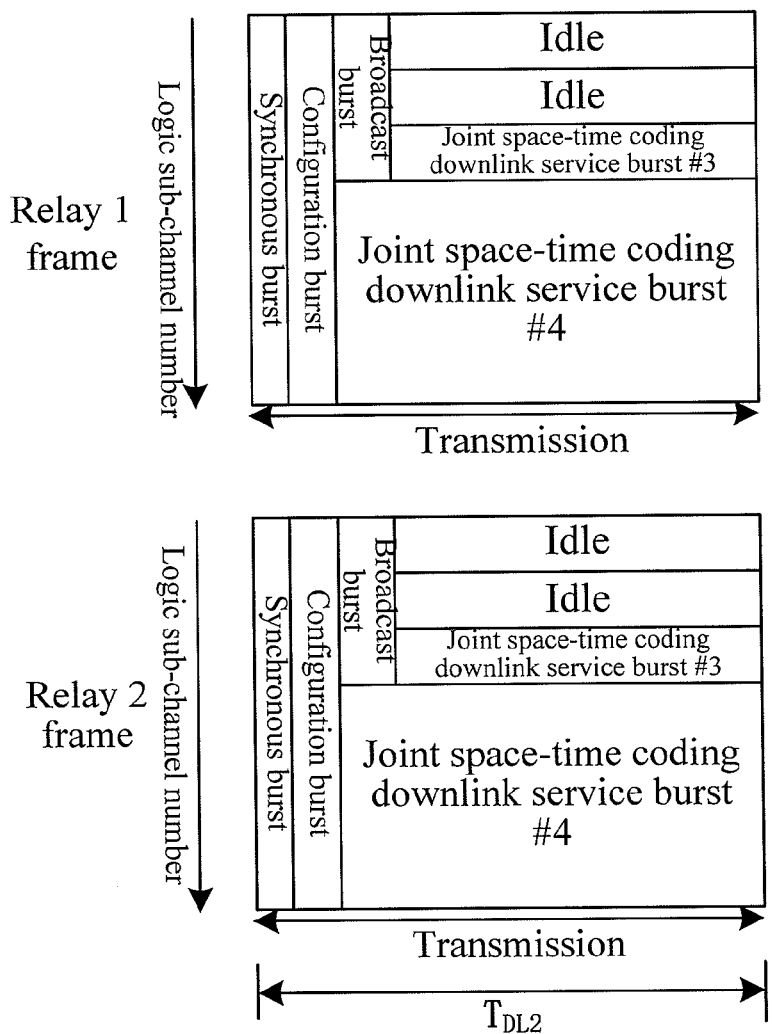
FIG. 5 is a schematic view of the structures of RS downlink sub-frames of two RSs for forwarding the same downlink signal.

FIG. 5 is a schematic view of two RS downlink sub-frame structures for forwarding the same downlink signal. Referring to FIG. 5, for describing concisely, the downlink wireless sub-frame of RS 1 is referred to as a relay 1 frame, and the downlink wireless sub-frame of RS 2 is referred to as a relay 2 frame. Taking the service bursts 3 of the relay 1 frame and relay 2 frame for example, the two service bursts 3 use the same time-frequency resource.

The two RSs receive the same service data that are used for the downlink service bursts 3. All service data have been processed in normal procedures, including coding, interlacing and symbol mapping, and then are space-time coded.

For example, in the two relay frame bursts 3, the number of subcarriers is K, the number of OFDM symbols is 2N, and the sequence to the No. k subcarrier after the interlacing and symbol mapping is $s_{k,1}$, $s_{k,2}$ ... $s_{k,2N-1}$, $s_{k,2N}$. The following describes RS 1 and RS 2 performing the space-time coding of different branches on the downlink signals from the BS with reference to Table 1.

TABLE 1

|  | RS 1 | | | | RS 2 | | | |
| --- | --- | --- | --- | --- | --- | --- | --- | --- |
|  | Symbol 1 | Symbol 2 | ... | Symbol 2N − 1 | Symbol 2N | Symbol 1 | Symbol 2 | ... | Symbol 2N − 1 | Symbol 2N |
| Subcarrier 1 | $s_{1,1}$ | $-s_{1,2}^*$ | ... | $s_{1,2N-1}$ | $-s_{1,2N}^*$ | $s_{1,2}$ | $s_{1,1}^*$ | ... | $s_{1,2N}$ | $s_{1,2N-1}^*$ |
| Subcarrier 2 | $s_{2,1}$ | $-s_{2,2}^*$ | ... | $s_{2,2N-1}$ | $-s_{2,2N}^*$ | $s_{2,2}$ | $s_{2,1}^*$ | ... | $s_{2,2N}$ | $s_{2,2N-1}^*$ |
| ... | | | ... | | | | | ... | | |
| Subcarrier K | $s_{K,1}$ | $-s_{K,2}^*$ | ... | $s_{K,2N-1}$ | $-s_{K,2N}^*$ | $s_{K,2}$ | $s_{K,1}^*$ | ... | $s_{K,2N}$ | $s_{K,2N-1}^*$ |

RS 1: After the space-time coding of the first branch, the data of the first OFDM symbol of the No. k (k=1, 2, ..., K) subcarrier is $s_{k,1}$, the data of the second OFDM symbol is $-s^*_{k,2}$, the data of the third OFDM symbol is $s_{k,3}$, the data of the fourth OFDM symbol is $-s^*_{k,4}$ ..., the data of the (2N−1)th OFDM symbol is $s_{k,2N-1}$, and the data of the 2Nth OFDM symbol is $-s^*_{k,2N}$.

RS 2: After the space-time coding of the first branch, the data of the first OFDM symbol of the No. k subcarrier is $s_{k,2}$, the data of the second OFDM symbol is $s^*_{k,1}$, the data of the third OFDM symbol is $s_{k,4}$, the data of the fourth OFDM symbol is $s^*_{k,3}$ ..., the data of the (2N−1)th OFDM symbol is $s_{k,2N}$, and the data of the 2Nth OFDM symbol is $s^*_{k,2N-1}$.

In other words, in the first OFDM symbol period, the two RSs send $s_{k,1}$ and $s_{k,2}$ respectively; in the second symbol period, the two RSs send $-s^*_{k,2}$ and $s^*_{k,1}$ respectively; in the third symbol period, the two RSs send $s_{k,3}$ and $s_{k,4}$ respectively; in the fourth symbol period, the two RSs send $-s^*_{k,4}$ and $s^*_{k,3}$ respectively; ..., in the (2N−1)th symbol period, the two RSs send $s_{k,2N-1}$ and $s_{k,2N}$ respectively; in the 2Nth symbol period, the two RSs send $-s^*_{k,2N}$ and $s^*_{k,2N-1}$ respectively.

Step 307: The RSs perform normal modulation on the downlink signals that are space-time coded differently, and send the downlink signals to the MS.

Step 308: The MS receives the downlink signals from the above RSs at the same time, and recovers the symbol sequence by means of diversity combination. For example, the RS group still contains two RSs.

As the wireless links between the MS and the two RSs have different paths, the difference between path attenuations from the MS to the two RSs is often great. According to the principle of diversity reception, in the previous situations, the MS can obtain the corresponding diversity gain.

Considering two continuous OFDM symbol periods, assume that the two RSs send $s_{k,1}$ and $s_{k,2}$ respectively in the first OFDM symbol period, and send $-s^*_{k,2}$ and $s^*_{k,1}$ respectively in the second OFDM symbol period. Accordingly, in this step:

the signal received by the MS in the first OFDM symbol period is expressed as follows:

$$r_0 = r_0(t) = h_0(t)s_{k,1} + h_1(t)s_{k,2} + n_0 \quad (4)$$

the signal received by the MS in the second OFDM symbol period is expressed as follows:

$$r_1 = r_1(t) = h_1(t+T)s^*_{k,1} - h_0(t+T)s^*_{k,2} + n_1 \quad (5)$$

In the previous two formulas, $h_0$ and $h_1$ are channel parameters from the two RSs to the MS respectively. Normally, the channel parameters from the RSs to the MS can be estimated according to pilot symbols; $n_0$ and $n_1$ are the complex noise and interference signal in the first OFDM symbol period and the second OFDM symbol period; r is the signal received by the MS, for example, r0 is the signal received by the MS in the first OFDM symbol period, and r1 is the signal received by the MS in the second OFDM symbol period.

Normally, in two continuous symbol periods, the channels basically remain unchanged, that is, $h_i(t)=h_i(t+T)=h_i$ (i=0,1). Therefore, the receiving end can use the following methods to combine the received signals:

$$\hat{s}_{k,1} = h^*_0 r_0 + h_1 r^*_1 = (|h_0|^2+|h_1|^2)s_{k,1} + h^*_0 n_0 + h_1 n^*_1 \quad (6)$$

$$\hat{s}_{k,2} = h^*_1 r_0 - h_0 r^*_1 = (|h_0|^2+|h_1|^2)s_{k,2} - h_0 n^*_1 + h^*_1 n_0 \quad (7)$$

After performing the maximum likelihood decoding on the combined signals, the transmitted symbol sequence of $s_{k,1}$, $s_{k,2}$, ..., $s_{k,2N-1}$, $s_{k,2N}$ can be recovered. It is known from the previous description that through the space-time coding and transmission, the maximum ratio combining can be performed at the reception end, so the MS can obtain the diversity gain. Compared with the techniques of transmitting signals by a single RS, the present invention improves the reliability of communication links, or in other words, reduces the probability of transmission errors, and thus, the communication rate is improved.

Step 309: The BS sends the downlink signals containing the service data to the only RS in the RS group.

The RS group for forwarding the downlink signals has only one RS, which means that the downlink quality between the RS and the MS is much better than those between other RSs and the MS. Therefore, the effect of forwarding the downlink signals by a plurality of RSs is similar to the effect of forwarding the downlink signals by this RS. To prevent the waste of resources, in this situation, only the RS corresponding to the best downlink quality is used to forward the downlink signals. At this time, the downlink wireless sub-frame of the BS does not contain the space-time coding instructions, but contain only the normal control information for instructing the RS normally to process the downlink signals, including coding, interlacing and symbol mapping, and modulating.

Step 310: The RS receives the downlink signals from the BS, performs normal process (coding, interlacing and symbol mapping, and modulating), and then forwards the downlink signals to the MS.

Step 311: The MS receives the downlink signals from the RS, and recovers the symbol sequence through normal manner. The processing in this step can use the prior art, which is not described here.

The present invention also discloses a BS and an MS corresponding to the method for the RSs to forward downlink signals according to the first embodiment of the present invention.

The BS includes a receiving unit, a calculating unit, a decision making unit, and a space-time coding instructions sending unit. The decision making unit includes a comparing sub-unit and a determining sub-unit.

The BS obtains the uplink qualities between the RSs and the MS reported by the RSs through the receiving unit. Then, the calculating unit estimates the downlink qualities between the MS and the RSs according to the uplink qualities and the preset resource configurations. After that, the comparing sub-unit selects the best downlink quality, and compares the differences between other downlink qualities and the best downlink quality with the preset threshold. The determining sub-unit determines whether to put the RSs corresponding to other downlink qualities into the RS group for forwarding the downlink signals according to the comparison results, and puts the RS corresponding to the best downlink quality into the RS group. Preferably, if the difference between the second best downlink quality and the best quality is smaller than the preset threshold, only the RS corresponding to the best downlink quality and the RS corresponding to the second best downlink quality are put into the RS group for forwarding the downlink signals. Therefore, the BS not only sends the downlink service data that needs to be forwarded by relays to the two RSs in the RS group, but also sends different space-time coding instructions to the RSs through the space-time coding instructions sending unit.

The MS includes a receiving unit and a diversity combining unit. When the BS forwards the downlink signals through the plurality of RSs in the RS group, at first, the receiving unit of the MS receives the downlink signals that are differently space-time coded from the RSs at the same time. Then, the diversity combining unit processes the downlink signals from the RSs by means of diversity combination, and recovers the transmitted symbol sequence. When the BS forwards the downlink signals through only one RS, the MS uses an existing normal unit to process the downlink signals from the RS.

In addition, the OFDMA system in the time division duplex (TDD) mode is taken as an example to illustrate this embodiment. For other systems, such as time division multiple access (TDMA) and code division multiple access (CDMA) systems, the previous solutions are also applicable. The application of the solutions in these systems is of the same principle, which is not described again here.

Figure 6:
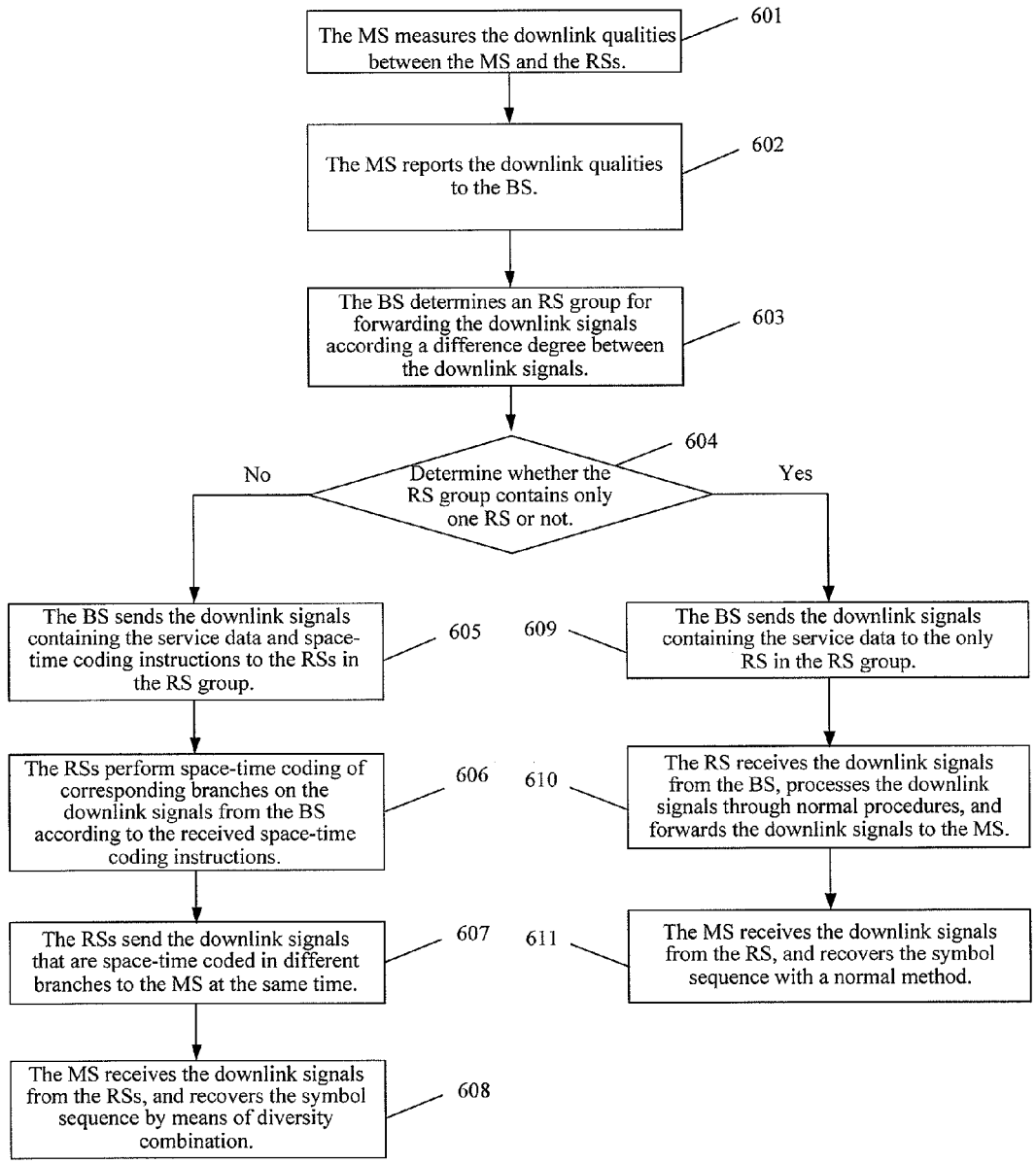
FIG. 6 is a flow chart of the method for RSs to forward downlink signals according to the second embodiment of the present invention.

FIG. 6 is a flow chart of the method for RSs to forward downlink signals according to the second embodiment of the present invention. Referring to FIG. 6, the difference between this embodiment and the first embodiment lies in the method for obtaining the downlink qualities between the MS and the RSs: in this embodiment, the MS directly measures the downlink signal qualities of the RSs, and then reports the qualities to the BS. After the BS obtains the previous information, the process is the same as that of the first embodiment.

Step 601: The MS measures the downlink qualities between the MS and each of the RSs.

The downlink qualities are normally the average power or signal-to-noise ratio of the signals received by the MS from the RSs.

Step 602: The MS reports the downlink qualities to the BS. A report threshold of the downlink qualities between the MS and the RSs can be set to reduce the unnecessary signaling overhead. If the measured downlink quality between the MS and an RS is smaller than the report threshold, the downlink quality is not reported to the BS; otherwise, the downlink quality is reported to the BS. Normally, the MS reports the downlink qualities through the RS designated by the BS.

Step 603: The BS determines the RS group for forwarding the downlink signals according to the difference degrees between the downlink qualities.

Step 604: Determine whether the RS group contains only one RS. If the RS group contains only one RS, proceed to Step 609, otherwise, proceed to Step 605.

Step 605: The BS sends the downlink signals containing service data and space-time coding instructions to each of the RSs in the RS group.

Step 606: The RSs perform the space-time coding of corresponding branches on the downlink signals from the BS according to the received space-time coding instructions.

Step 607: The RSs send the downlink signals that are space-time coded differently to the MS at the same time.

Step 608: The MS receives the downlink signals from the different RSs, and recovers the symbol sequence by means of diversity combination.

Step 609: The BS sends the downlink signals containing the service data to the only RS in the RS group.

Step 610: The RS receives the downlink signals from the BS, performs normal process (coding, interlacing and symbol mapping, and modulating and the like), and then directly forwards the downlink signals to the MS.

Step 611: The MS receives the downlink signals from the RS, and recovers the symbol sequence through normal manner.

The present invention also discloses a BS and an MS corresponding to the method for the RSs to forward downlink signals according to the second embodiment of the present invention.

In this embodiment, the MS directly measures the downlink qualities between the MS and the RSs, so the BS does not need to calculate the downlink qualities between the RSs and the MS. Thus, compared with the BS structure of the first embodiment, the BS disclosed in this embodiment does not need to include the calculating unit, while the structures of other units in the BS disclosed in this embodiment are the same as those in the BS of the first embodiment. Compared with the MS structure of the first embodiment, the MS structure of this embodiment further includes a downlink measuring unit for measuring the downlink qualities between the MS and the RSs. The detailed structures of the MS and BS are as follows.

The MS includes a downlink measuring unit, a receiving unit, and a diversity combining unit. Firstly, the downlink measuring unit measures the downlink qualities between the MS and each of the RSs. Then, the MS reports the measurement data to the BS through the RS designated by the BS.

The BS includes a receiving unit, a decision making unit, and a space-time coding instructions sending unit. The decision making unit includes a comparing sub-unit and a determining sub-unit.

The BS obtains the downlink qualities between the RSs and the MS reported by the MS through the receiving unit. The comparing sub-unit selects the best downlink quality, and compares the differences between other downlink qualities and the best downlink quality with the preset threshold. The determining sub-unit determines whether to put the RSs corresponding to other downlink qualities into the RS group for forwarding the downlink signals according to the comparison results, and puts the RS corresponding to the best downlink quality into the RS group. Preferably, if the difference between the second best downlink quality and the best quality is smaller than the preset threshold, only the RS corresponding to the best downlink quality and the RS corresponding to the second best downlink quality are put into the RS group for forwarding the downlink signals. Therefore, the BS not only sends the downlink service data that needs to be forwarded by relays to the two RSs in the RS group, but also sends different space-time coding instructions to the RSs through the space-time coding instructions sending unit.

When the BS forwards the downlink signals through the plurality of RSs in the RS group, firstly, the receiving unit of the MS receives the downlink signals that are differently space-time coded from the RSs at the same time, then, the diversity combining unit processes the downlink signals from the RSs by means of diversity combination, and recovers the transmitted symbol sequence. When the BS forwards the downlink signals through only one RS, the MS uses a existing normal unit to process the downlink signals from the RS.

Figure 7:
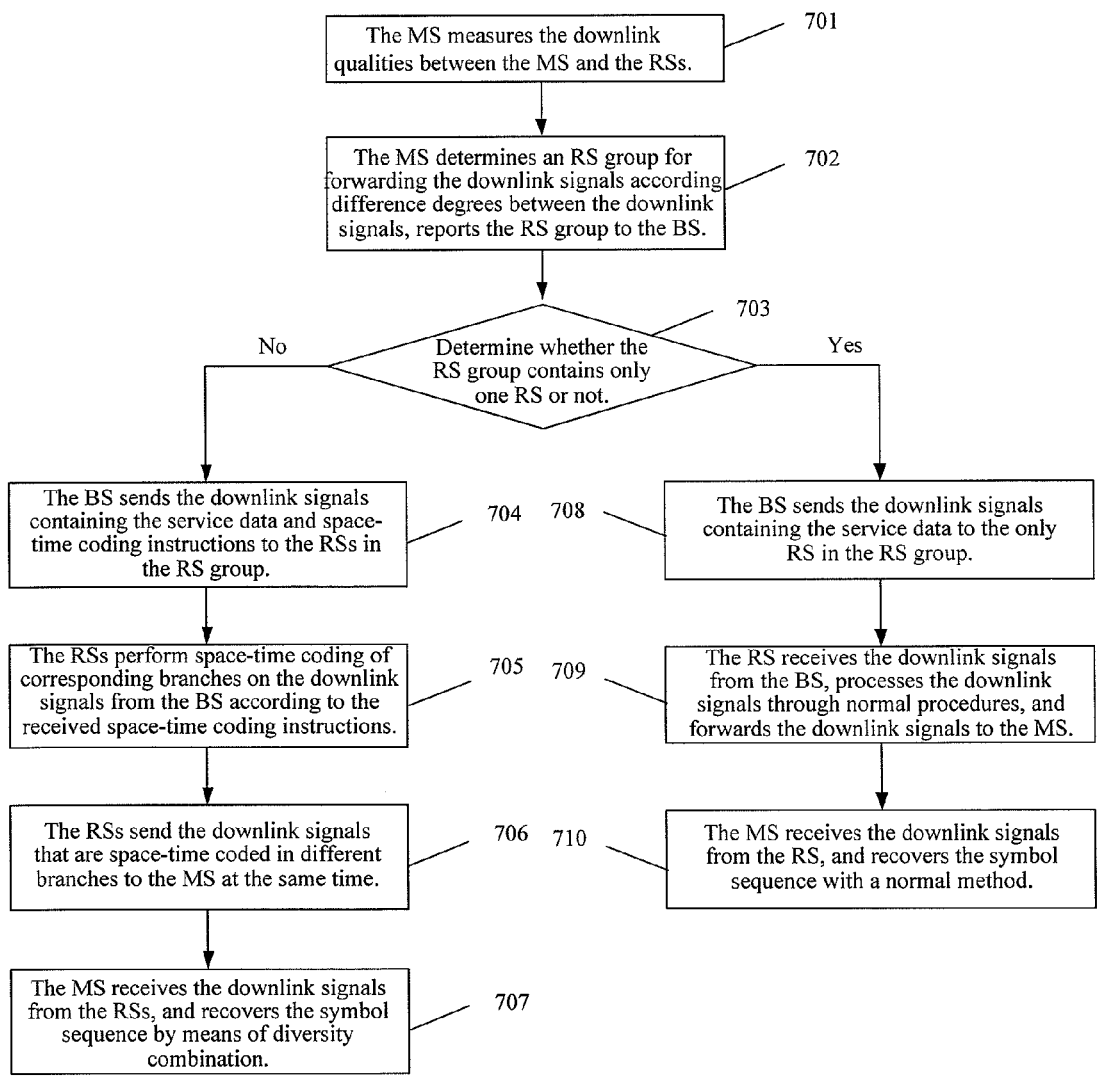
FIG. 7 is a flow chart of the method for RSs to forward downlink signals according to the third embodiment of the present invention.

FIG. 7 is a flow chart of the method for RSs to forward downlink signals according to the third embodiment of the present invention. The difference between this embodiment and the second embodiment is that the MS makes decisions and determines the RS group for forwarding the downlink signals, and then reports the RS group to the BS. After the BS obtains the information about the RS group, the process is the same as that of the second embodiment.

Step 701: The MS measures the downlink qualities between the MS and each of the RSs.

Step 702: The MS determines the RS group for forwarding the downlink signals according to the difference degrees between the downlink qualities, and reports the RS group to the BS.

Step 703: The BS determines whether the RS group contains only one RS. If the RS group contains only one RS, proceed to Step 708, otherwise, proceed to Step 704.

Step 704: The BS sends the downlink signals containing service data and space-time coding instructions to each of the RSs in the RS group.

Step 705: The RSs perform the space-time coding of corresponding branches on the downlink signals from the BS according to the received space-time coding instructions.

Step 706: The RSs send the downlink signals that are space-time coded differently to the MS at the same time.

Step 707: The MS receives the downlink signals from the different RSs, and recovers the symbol sequence by means of diversity combination.

Step 708: The BS sends the downlink signals containing the service data to the only RS in the RS group.

Step 709: The RS receives the service data, performs normal process (coding, interlacing and symbol mapping, and modulating), and then directly forwards the service data to the MS.

Step 710: The MS receives the downlink signals from the RS, and recovers the symbol sequence through normal manner.

The present invention also discloses a BS and an MS corresponding to the method for the RSs to forward downlink signals according to the third embodiment of the present invention.

The MS includes a downlink measuring unit, a decision making unit, a receiving unit, and a diversity combining unit. The decision making unit includes a comparing sub-unit and a determining sub-unit.

Firstly, the downlink measuring unit measures the downlink qualities between the RSs and the MS. The comparing sub-unit selects the best downlink quality, and compares the differences between other downlink qualities and the best downlink quality with the preset threshold to determine a difference degree between the downlink qualities. The determining sub-unit determines whether to put the RSs corresponding to other downlink qualities into the RS group for forwarding the downlink signals according to the comparison results, and puts the RS corresponding to the best downlink quality into the RS group. Preferably, if the difference between the second best downlink quality and the best quality is smaller than the preset threshold, the RS corresponding to the best downlink quality and the RS corresponding to the second best downlink quality are put into the RS group for forwarding the downlink signals.

Secondly, after the MS determines the RS group, the MS reports the specific information about the RS group according to the RS designated by the BS, and then delivers the information to the BS for processing.

The BS includes a receiving unit and a space-time coding instructions sending unit. The receiving unit receives the information about the RS group reported by the MS; if the RS group contains a plurality of RSs, the space-time coding instructions sending unit sends different space-time coding instructions to the above RSs respectively. The RSs perform the space-time coding of the corresponding branch on the downlink signals to be forwarded according to the space-time coding instructions, and then forward the space-time coded downlink signals to the MS at the same time.

Then, the receiving unit of the MS receives the downlink signals that are space-time coded differently from the RSs at the same time; after that, the diversity combining unit processes the above downlink signals from the RSs by means of diversity combination, and recovers the transmitted symbol sequence.

When the determined RS group contains only one RS, the BS does not send the space-time coding instructions to the RS, and accordingly, the RS does not perform the space-time coding on the downlink signals to be forwarded, but performs the downlink signals through normal process including coding, interlacing, symbol mapping, and modulating and then sends the processed downlink signals to the MS. Therefore, the MS does not use the diversity combining unit, but processes the downlink signals from the RS through normal manner.

Figure 8:
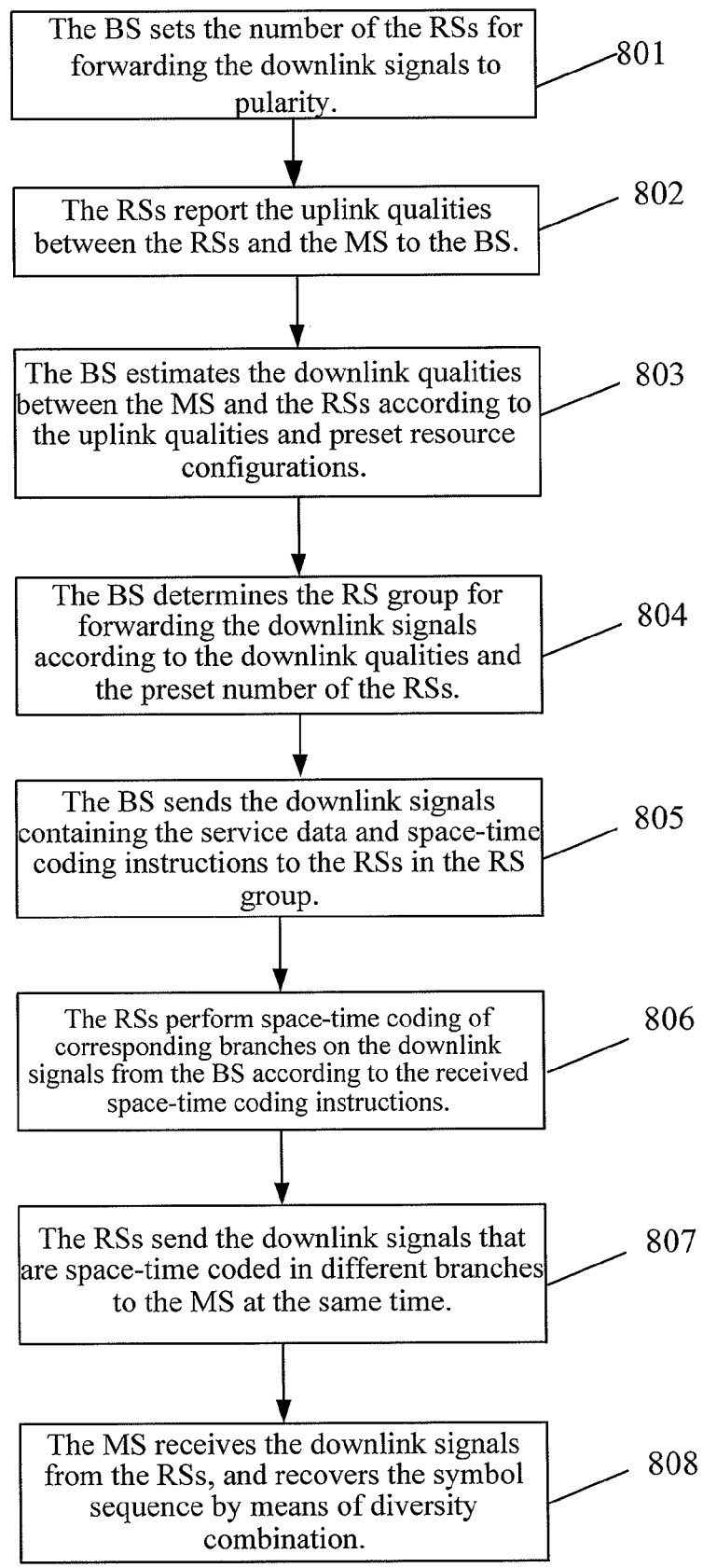
FIG. 8 is a flow chart of the method for RSs to forward downlink signals according to the fourth embodiment of the present invention.

FIG. 8 is a flow chart of the method for RSs to forward downlink signals according to the fourth embodiment of the present invention. The difference between this embodiment and the first embodiment lies that the number of the RSs for forwarding the downlink signals is set directly, and then the RS group for forwarding the downlink signals is determined according to the number and the downlink qualities between the RSs and the MS.

Step 801: The BS sets the number of the RSs for forwarding the downlink signals to two or more. Preferably, the number is set to two.

Step 802: The RSs report uplink qualities between the RSs and an MS to a BS.

Step 803: The BS estimates the downlink qualities between the MS and the RSs according to the uplink qualities and preset resource configurations.

Step 804: The BS determines the RS group for forwarding the downlink signals according to the downlink qualities and the preset number of the RSs.

Normally, the RS group is determined according to the preset number and in a sequence from the best downlink quality to the worst downlink quality. For example, if the number of the RSs for forwarding downlink signals is set to two in Step 801, the RSs corresponding to the best downlink quality and the second best downlink quality are put into the RS group.

When the preset number of the RSs is greater than the number of available RSs, each of the selectable RSs can be put into the RS group. Preferably, to reduce the unnecessary signaling overhead, a quality threshold can be set according to a target quality of communication. In the scope of the preset number of the RSs, the RSs corresponding to the downlink qualities greater than the quality threshold are put into the RS group, and the RSs corresponding to the downlink qualities smaller than the quality threshold are not put into the RS group.

Based on the previous situation, it is possible that the determined RS group contains only one RS though the number of the RSs for forwarding the downlink signals is set to two or more. At this time, the processing method is the same as the prior art, which is not described here. The following process is only directed to the situation in which the RS group contains a plurality of RSs.

Step 805: The BS sends the downlink signals containing service data and space-time coding instructions to each of the RSs in the RS group.

Step 806: The RSs perform the space-time coding of corresponding branches on the downlink signals from the BS according to the received space-time coding instructions.

Step 807: The RSs send the downlink signals that are space-time coded differently to the MS at the same time.

Step 808: The MS receives the downlink signals from the different RSs, and recovers the symbol sequence by means of diversity combination.

The present invention also discloses a BS and an MS corresponding to the method for the RSs to forward downlink signals according to the fourth embodiment of the present invention.

The BS includes a number setting unit, a receiving unit, a calculating unit, a decision making unit, and a space-time coding instructions sending unit.

The BS sets the number of the RSs for forwarding the downlink signals through the number setting unit. The receiving unit obtains the uplink qualities between the RSs and the MS reported by the RSs. Then, the calculating unit estimates the downlink qualities between the MS and the RSs according to the uplink qualities and the preset resource configurations. After that, the decision making unit determines the specific RSs in the RS group according to the downlink qualities and the preset number of the RSs. For example, if the number of the RSs for forwarding downlink signals is set to two, the RSs corresponding to the best downlink quality and the second best downlink quality are put into the RS group. Therefore, the BS not only sends the downlink service data that needs to be forwarded by relays to the two RSs in the RS group, but also sends different space-time coding instructions to the RSs through the space-time coding instructions sending unit.

The MS includes a receiving unit and a diversity combination unit. When the determined RS group contains a plurality of RSs, the receiving unit receives the downlink signals that are differently space-time coded from the RSs at the same time. Then, the diversity combining unit processes the downlink signals from the RSs by means of diversity combination, and recovers the symbol sequence. When the determined RS group contains only one RS, the MS processes the downlink signals from the RS through normal manner.

In addition, in the fourth embodiment, the MS can directly measure the downlink qualities between the MS and the RSs, and reports the downlink qualities to the BS. Accordingly, the BS does not need to set the calculating unit, but the MS may need to increase an additional downlink measuring unit for measuring the downlink qualities between the MS and the RSs.

Figure 9:
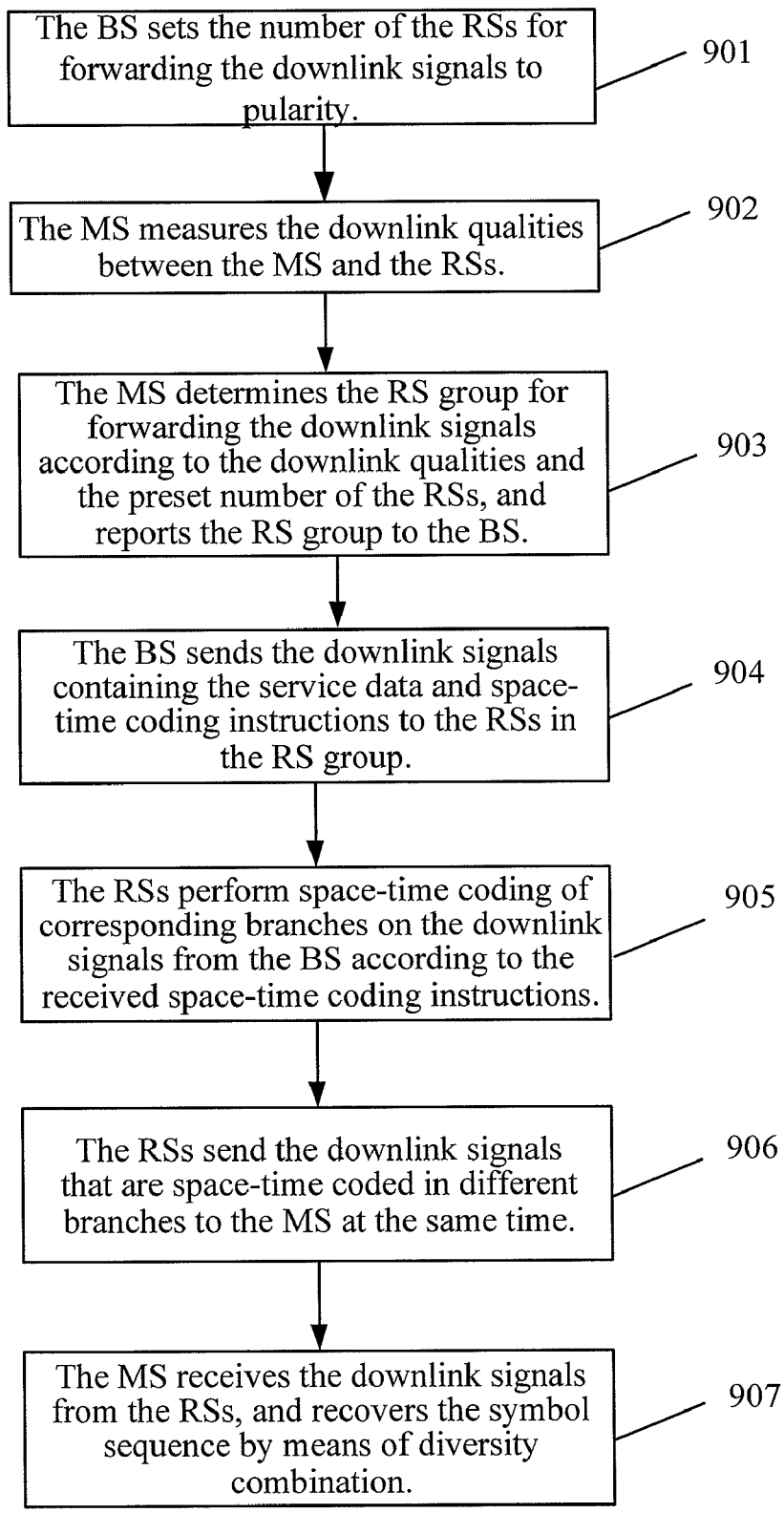
FIG. 9 is a flow chart of the method for RSs to forward downlink signals according to the fifth embodiment of the present invention.

FIG. 9 is a flow chart of the method for RSs to forward downlink signals according to the fifth embodiment of the present invention. The difference between this embodiment and the fourth embodiment is that the MS determines the RS group.

Step 901: The BS sets the number of the RSs for forwarding the downlink signals to two or more, and reports the number to the MS. Preferably, the number is set to two.

Step 902: The MS measures the downlink qualities between the MS and each of the RSs.

Step 903: The MS determines the RS group for forwarding the downlink signals according to the downlink qualities and the preset number of the RSs, and reports the RS group to the BS. The method for the MS to determine the RS group is the same as the method for the BS to determine the RS group according to the downlink qualities and the number of the RSs in the fourth embodiment, and is not described again here.

Step 904: The BS sends the downlink signals containing service data and space-time coding instructions to each of the RSs in the RS group.

Step 905: The RSs perform the space-time coding of corresponding branches on the downlink signals from the BS according to the received space-time coding instructions.

Step 906: The RSs send the downlink signals that are space-time coded differently to the MS at the same time.

Step 907: The MS receives the downlink signals from the different RSs at the same time, and recovers the symbol sequence by means of diversity combination.

The present invention also discloses a BS and an MS corresponding to the method for the RSs to forward downlink signals according to the fifth embodiment of the present invention.

The MS includes a downlink measuring unit, a decision making unit, a receiving unit, and a diversity combining unit. The decision making unit includes a comparing sub-unit and a determining sub-unit.

Firstly, the MS receives control information about the number of the RSs for forwarding the downlink signals from the BS. The downlink measuring unit measures the downlink qualities between the MS and the RSs. The decision making unit determines the RSs in the RS group according to the downlink qualities and the preset number of the RSs. In detail, the comparing sub-unit selects the best downlink quality, and compares the differences between other downlink qualities and the best downlink quality with the preset threshold to determine a difference degree between the downlink qualities. The determining sub-unit determines the RSs corresponding to other downlink qualities according to the comparison results, and determines the RS group for forwarding the downlink signals according to the number of the RSs designated by the BS and the difference degree between the downlink qualities.

Secondly, after the MS determines the RS group, the MS reports the information about the RS group according to the RS designated by the BS, and then delivers the information to the BS for processing.

The BS includes a number setting unit, a receiving unit, and a space-time coding instructions sending unit. The number setting unit sets the number of the RSs for forwarding the downlink signals, and reports the number to the MS. The receiving unit receives the information about the RS group reported by the MS; if the RS group contains a plurality of RSs, the space-time coding instructions sending unit sends different space-time coding instructions to the RSs respectively. The RSs perform the space-time coding of the corresponding branches on the downlink signals to be forwarded according to the space-time coding instructions, and then forward the space-time coded downlink signals to the MS at the same time.

Then, the receiving unit of the MS receives the downlink signals that are space-time coded differently from the RSs at the same time; after that, the diversity combining unit processes the downlink signals from the RSs by means of diversity combination, and recovers the symbol sequence.

Figure 10:
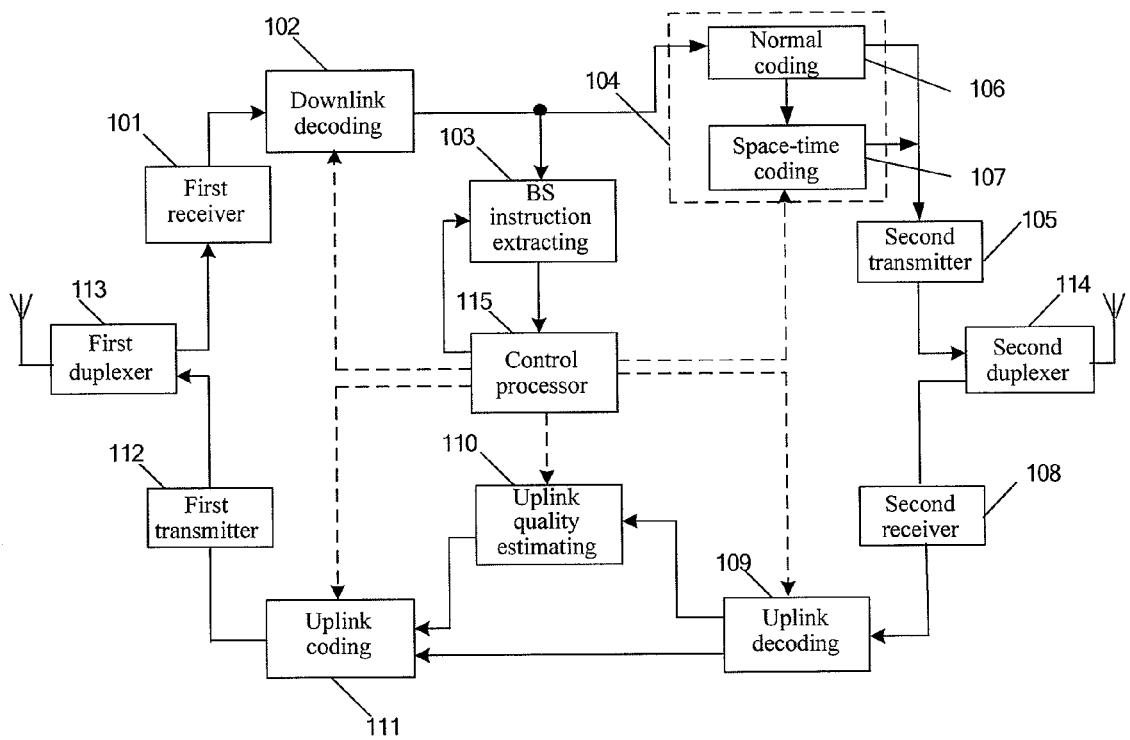
FIG. 10 is a schematic view of an RS structure according to an embodiment of the present invention.

FIG. 10 is a schematic view of an RS structure of the present invention.

Referring to FIG. 10, the RS acting as a bridge between the MS and the BS needs to forward the downlink data from the BS and the uplink data from the MS. Therefore, the RS mainly includes an uplink processing unit and a downlink processing unit. The downlink processing unit includes a first receiver 101, a downlink decoding unit 102, a BS instruction extracting unit 103, a downlink coding unit 104, and a second transmitter 105. The uplink processing unit includes a second receiver 108, an uplink decoding unit 109, an uplink quality estimating unit 110, an uplink coding unit 111, and a first transmitter 112. The antenna, a first duplexer 113, and a second duplexer 114 are standard components, and can realize the transceiving function through a single antenna.

The downlink processing unit performs the following processing: the first receiver 101 performs a series of processing including converting radio frequency (RF) signals to digital signals. The downlink decoding unit 102 performs demodulating, symbol demapping, deinterlacing, and channel decoding on the digital signals output from the first receive 101, and obtains the original information data that is not coded. Then, the downlink coding unit 104 processes the information data processed by the downlink decoding unit 102, and performs new processing including channel coding, interlacing, symbol mapping, and modulating. The second transmitter 105 converts the signals output from the downlink coding unit 104 to RF signals, and sends the RF signals from the antenna through the second duplexer 114.

Figure 11:
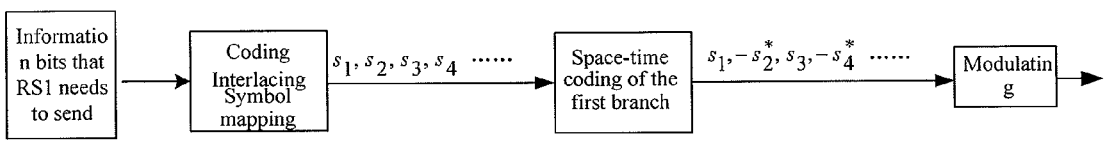
FIG. 11 is a schematic view showing two RSs performing the joint space-time coding according to an embodiment of the present invention.
Figure 11:
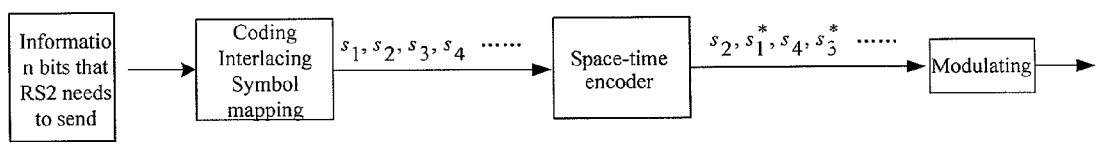

The difference between the previous RS structure and the prior art is that in addition to a normal sub-unit 106, the downlink coding unit 114 further includes a space-time coding sub-unit 107, and the space-time coding sub-unit 107 includes a plurality of branch structures. The BS instructions extracted by the BS instruction extracting unit 103 control which branch is used by the RS to perform the space-time coding. Assuming that the BS determines that two RSs are used to forward the downlink signals, the BS sends the same service data and different space-time coding instructions to the two RSs. Moreover, the RSs use their BS instruction extracting units 103 to obtain respective space-time coding instructions. The space-time coding instructions instruct the space-time coding sub-unit 107 to select which branch to perform the space-time coding. At this time, the RS not only performs normal processing including channel coding, interlacing, symbol mapping, and modulating with the normal sub-unit 106, but also performs special processing, namely, the space-time coding of a branch, with the space-time coding sub-unit 107. FIG. 11 is a schematic view showing two RSs performing the joint space-time coding according to an embodiment of the present invention. In RS 1 and RS 2, the information bits that need to be sent are the same, and the symbol sequences after the normal coding, interlacing, and symbol mapping processes are also the same: $s_1$, $s_2$, $s_3$, $s_4$ . . . ; after that, in RS 1, the space-time coding is performed on the symbol sequence, and the sequence of $s_1$, $-s^*_2$, $s_3$, $-s^*_4$ . . . is output; in RS 2, the space-time coding is performed on the symbol sequence, and the sequence of $s_2$, $s^*_1$, $s_4$, $s^*_3$ . . . is output. The two space-time coded signals are modulated as normal, and then are sent to the MS at the same time.

Figure 12:
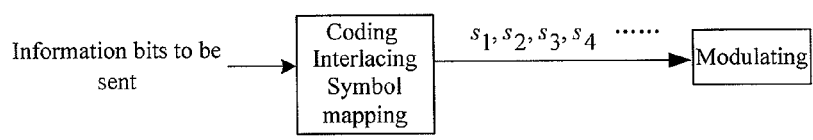
FIG. 12 is a schematic view showing an RS performing the normal coding according to an embodiment of the present invention.

When the BS determines that only one RS is used to forward the downlink signals, the downlink signals sent to the RS do not contain the space-time coding instructions, and the RS performs normal processing, such as channel coding, interlacing, symbol mapping, and modulating, on the service data through the normal sub-unit. FIG. 12 is a schematic view showing an RS performing the normal coding according to an embodiment of the present invention.

The working principles of the uplink processing unit are similar to those of the downlink processing unit. The main difference between them is that the uplink processing unit further includes an uplink quality estimating unit 110 which estimates the link qualities of uplink channels according to an output of the second receiver 108. After the uplink coding unit 111 encodes the link qualities of the uplink channels according to a given standard, a control processor 115 reports the coded uplink qualities to the BS. Thus, the BS estimates the downlink qualities between the MS and the RSs according to the uplink qualities reported by the RSs and preset resource configurations, so as to determine the RS group for forwarding the downlink signals may need to contain a plurality of RSs or only one RS.

Moreover, in actual applications, if the links between the BS and the RSs and the links between the RSs and the MS adopt the same communication mode (for example, CDMA, TDMA, or OFDMA) for time division multiplexing, the system can use only one set of transceiving equipment, and can control the operation of different units through the control processor 115. At this time, the relevant units perform the uplink and downlink functions at different time.

The method and device for RSs to forward downlink signals of the present invention are illustrated in detail. In the specification, detailed examples are given to describe the principle and embodiments of the present invention. The embodiments help to understand the methods and core idea of the present invention; however, persons skilled in the art can make some modifications and variations according to the idea of the present invention. Therefore, the specification should not be construed as limitations to the present invention.

What is claimed is:

1. A method for relay stations (RSs) to forward downlink signals, comprising:
   obtaining downlink qualities between a mobile station (MS) and each of the RSs;
   determining an RS group for forwarding downlink signals according to difference degrees among all of the downlink qualities; and
   forwarding, by each of the RSs in the RS group, the downlink signals to the MS.

2. The method for RSs to forward downlink signals according to claim 1, wherein determining the RS group for forwarding downlink signals comprises:
   putting the RS corresponding to a best downlink quality into the RS group; and
   comparing differences between the other downlink qualities and the best downlink quality with a preset threshold, and putting the RSs corresponding to the other downlink qualities whose differences from the best downlink quality are smaller than the preset threshold into the RS group;
   wherein the preset threshold is determined according to a target quality of communication.

3. The method for RSs to forward downlink signals according to claim 1, wherein forwarding, by each of the RSs in the RS group, the downlink signals to the MS comprises: when the RS group contains at least two RSs,
sending, by a base station (BS), the downlink signals containing service data and space-time coding instructions to each of the RSs in the RS group;
performing, by each of the RSs, space-time coding of corresponding branches on the downlink signals from the BS according to the received space-time coding instructions; and
forwarding, by each of the RSs, the space-time coded downlink signals to the MS at the same time.

4. The method for RSs to forward downlink signals according to claim 1, wherein forwarding, by each of the RSs in the RS group, the downlink signals to the MS comprises: when the RS group contains one RS,
sending, by a BS, the downlink signals containing service data to the RS in the RS group; and
performing, by the RS, normal processing on the received downlink signals, and forwarding the downlink signals to the MS;
wherein the normal processing comprises coding, interlacing and symbol mapping, and adjusting.

5. The method for RSs to forward downlink signals according to claim 1, wherein:
the downlink qualities are obtained by a BS, and the RS group is determined by the BS according to the downlink qualities.

6. The method for RSs to forward downlink signals according to claim 5, wherein the obtaining the downlink qualities by the BS comprises:
receiving, by the BS, uplink qualities between each of the RSs and the MS reported by each of the RSs, and estimating the downlink qualities between the MS and each of the RSs according to the uplink qualities and preset resource configurations; or
receiving, by the BS, the downlink qualities between the MS and each of the RSs reported by the MS.

7. The method for RSs to forward downlink signals according to claim 1, wherein the downlink qualities are obtained by the MS, and the RS group is determined by the MS according to the downlink qualities, and the method further comprising:
reporting, by the MS, the RS group to a base station (BS).

8. A method for relay stations (RSs) to forward downlink signals, wherein number of the RSs for forwarding the downlink signals is set to plurality, and the method comprises:
obtaining downlink qualities between a mobile station (MS) and each of the RSs;
determining an RS group for forwarding the downlink signals according to each of the downlink qualities and the number of the RSs; and
when the RS group contains at least two RSs, sending the downlink signals containing service data and space-time coding instructions to each of the RSs in the RS group.

9. The method for RSs to forward downlink signals according to claim 8, wherein determining the RS group for forwarding the downlink signals comprises:
putting the RS corresponding to a best downlink quality into the RS group; and
putting each of the selectable RSs corresponding to the other downlink qualities into the RS group according to the set number of the RSs.

10. The method for RSs to forward downlink signals according to claim 8, wherein the determining the RS group for forwarding the downlink signals comprises: putting the RSs corresponding to the downlink qualities greater than or equal to a preset quality threshold into the RS group.

11. The method for RSs to forward downlink signals according to claim 8, wherein sending the downlink signals containing the service data and space-time coding instructions to each of the RSs in the RS group comprises:
sending, by a base station (BS), the downlink signals containing the service data and space-time coding instructions to each of the RSs in the RS group.

12. The method for RSs to forward downlink signals according to claim 8, wherein the downlink qualities are obtained by a base station (BS), and the RS group is determined by the BS according to the downlink qualities and the set number of the RSs for forwarding the downlink signals.

13. The method for RSs to forward downlink signals according to claim 12, wherein the obtaining the downlink qualities by the BS comprises:
receiving, by the BS, uplink qualities between each of the RSs and the MS reported by each of the RSs, and estimating the downlink qualities between the MS and each of the RSs according to the uplink qualities and preset resource configurations; or
receiving, by the BS, the downlink qualities between the MS and each of the RSs reported by the MS.

14. The method for RSs to forward downlink signals according to claim 8, wherein the downlink qualities are obtained by the MS, and the RS group is determined by the MS according to the downlink qualities, and the method further comprising:
reporting, by the MS, the RS group to a BS.

15. A base station (BS), comprising:
a decision making unit configured to determine a relay station (RS) group for forwarding downlink signals according downlink qualities between a mobile station (MS) and each of RSs; and
a sending unit configured to send the downlink signal containing the service data and space-time coding instructions to each of the RSs in the RSs group.

16. The BS according to claim 15, further comprising:
a receiving unit configured to obtain the downlink qualities between the MS and each of the RSs.

17. The BS according to claim 15, further comprising:
a receiving unit configured to obtain the uplink qualities between the MS and each of the RSs reported by the RSs; and
a calculating unit configured to estimate the downlink qualities between the MS and each of the RSs according to the uplink qualities and preset resource configurations.

18. A base station (BS), comprising:
a number setting unit configured to set number of relay stations (RSs) for forwarding downlink signals;
a decision making unit configured to determine an RS group for forwarding the downlink signals according to differences of downlink qualities between an mobile station (MS) and each of the RSs and the number of RSs; and
a space-time coding instructions sending unit configured to send space-time coding instructions different with each other to the plurality of RSs in the RS group.

19. The BS according to claim 18, further comprising a calculating unit configured to estimate the downlink qualities between the MS and each of the RSs according to each of uplink qualities and preset resource configurations.

20. A relay station (RS), comprising a base station (BS) instruction extracting unit, and further comprising:
a space-time coding unit configured to perform space-time coding of a corresponding branch of downlink signals from a BS according to space-time coding instructions in the BS instruction extracting unit.

21. A mobile station (MS) comprising:
a downlink measuring unit configured to measure downlink qualities between the MS and each of relay stations (RSs);
a decision making unit configured to determine an RS group for forwarding downlink signals according to the downlink qualities; and
a diversity combining unit configured to perform diversity combination of the differently space-time coded downlink signals from the RSs in the RS group and received at the same time;
wherein the decision making unit comprises:
a comparing sub-unit configured to select a best downlink quality, and compare differences between the other downlink qualities and the best downlink quality with a preset threshold to determine a difference degree between the downlink qualities; and
a determining sub-unit configured to determine whether to put the RSs corresponding to the other downlink qualities into the RS group for forwarding the downlink signals according to comparison results, and put the RS corresponding to the best downlink quality into the RS group.

22. A mobile station (MS), comprising:
a downlink measuring unit configured to measure downlink qualities between the MS and each of relay stations (RSs);
a decision making unit configured to determine an RS group for forwarding downlink signals according to the downlink qualities; and
a diversity combining unit configured to perform diversity combination of the differently space-time coded downlink signals from the RSs in the RS group and received at the same time;
wherein the decision making unit comprises:
a comparing sub-unit configured to select a best downlink quality, and compare differences between the other downlink qualities and the best downlink quality with a preset threshold to determine a difference degree between the downlink qualities; and
a determining sub-unit configured to determine the RSs corresponding to the other downlink qualities according to comparison results, and determine the RS group for forwarding the downlink signals according to the number of the RSs designated by a base station (BS) and the difference degree between the downlink qualities.

23. A method for relay stations (RSs) to forward downlink signals, comprising:
obtaining, by a base station (BS), downlink qualities between a mobile station (MS) and each of the RSs;
determining, by the BS, an RS group for forwarding downlink signals according to the downlink qualities; and
sending, by the BS, the downlink signals containing service data and space-time coding instructions to each of the RSs in the RS group.

* * * * *